Aug. 28, 1928.
L. A. T. SOLDANE
MILEAGE ROUTE CHART
Filed Oct. 6, 1925
1,682,151
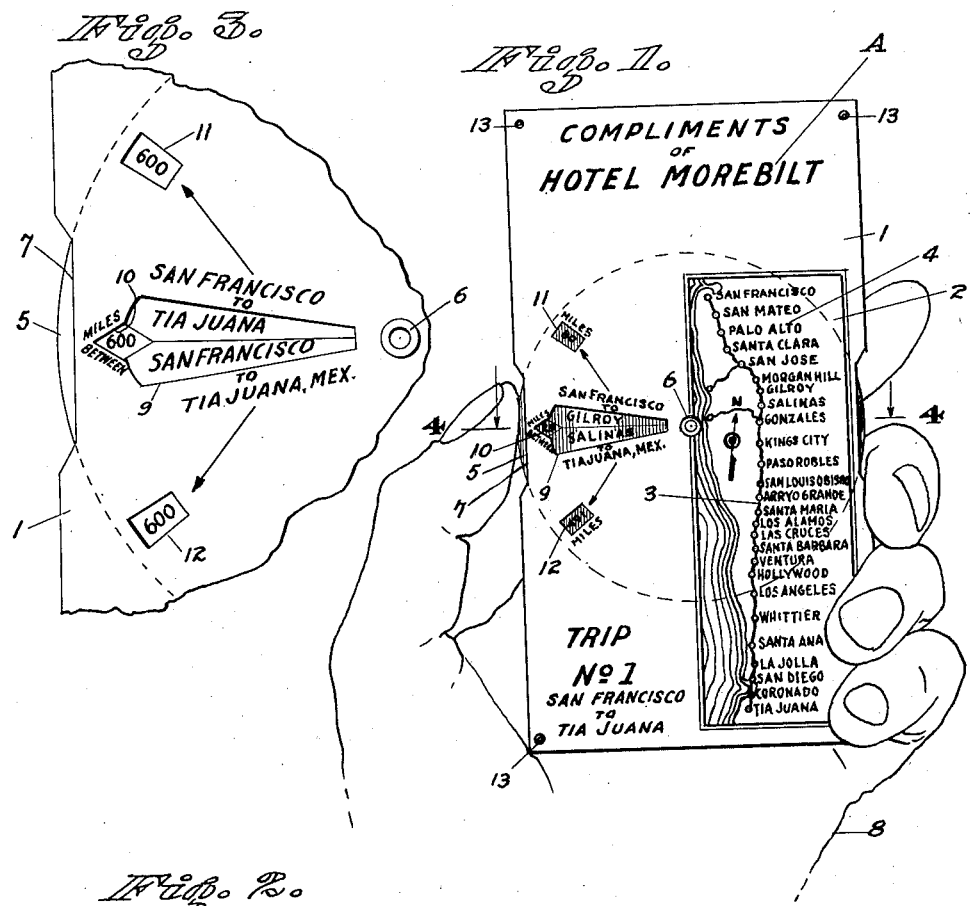
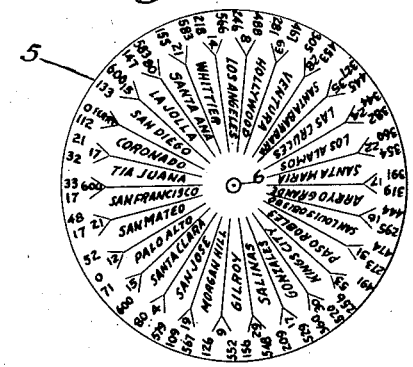
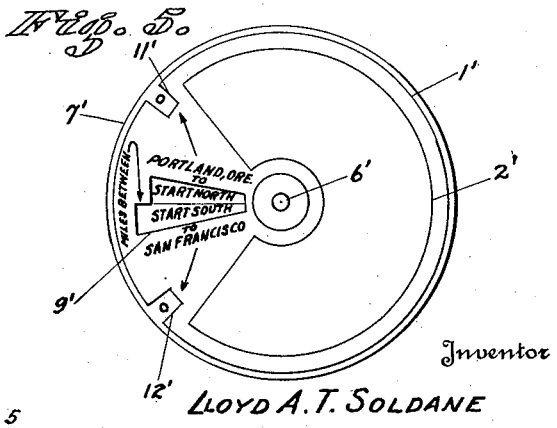
Inventor
LLOYD A. T. SOLDANE
By Miller & Boyken
His Attorneys Patented Aug. 28, 1928.

1,682,151

UNITED STATES PATENT OFFICE.

LLOYD A. T. SOLDANE, OF GRENADA, CALIFORNIA.

MILEAGE ROUTE CHART.

Application filed October 6, 1925. Serial No. 60,845.

This invention relates to mechanical charts in general but particularly to road maps as used by automobile tourists.

The principal object of the invention is to provide a compact device operable by one hand of a motorist to indicate data pertinent to points along a road being traveled upon, and preferably exhibiting a map of the road with the cities or other important points indicated therealong.

Other objects appear in the following description.

Briefly described my invention comprises a card preferably of elongated proportions adapted to be held in one hand and bearing on its face the map of a road of any desired trip with the cities which the road connects designated on the map, and adjacent the map is a rotatable dial indicating upon progressive rotation the distance traveled to any point on the road, also the distance to be traveled to the final destination from any point, and also the distance to the next adjacent point.

The drawings hereto show two embodiments of the invention, though it will be understood that variations may be made within the spirit of the invention and any such are intended to be covered in my appended claims.

Figure 1 shows approximately full size the complete device as held in the left hand of a vehicle driver.

Fig. 2 is a detached view of the revolvable dial.

Fig. 3 is a fragmentary view of the device of Fig. 1 with the dial set to indicate the distance at the start of the trip from either end of the road.

Fig. 4 is a central cross section of the device of Fig. 1.

Fig. 5 shows a modified form of the device.

In further detail the device comprises a card 1 bearing a road map $a$ upon its face, with the road 3 running up and down and having the names 4 of the various cities printed horizontally one above the other, the road chosen for illustration being the main highway from San Francisco, California, to Tia Juana, Mexico. Above the map is a space for printing or other matter as at "A". The card 1 may be single or double, and in back of the card if single or between the cards if double is located a dial 5 revolubly pivoted to the card at 6. This dial is preferably of a diameter equal to the width of the card so as to pack nicely and the edges of the card are notched as indicated at 7 to make the edge of the dial accessible for operating by the fingers of one hand 8 of the driver so that the dial may be manipulated en route while guiding the car with the other hand.

When the card is held to view as in Figure 1 the road upon the map extends substantially in the same direction as the actual road being traveled upon and the dial bears on radial lines the names of all the cities or other points of interest along the road in conformity with the map, and when the dial is turned the cities successively appear at a main window 9 in the face of the card.

This window 9 is made large enough so that the names of two cities are always visible through it and on a medial line is a notch 10 exposing to view a numeral printed on the dial expressing the distance between the two cities, while at 11 and 12 are smaller windows exposing respectively numerals indicating the distance from the upper and lower cities exposed in the window to the cities at opposite ends of the trip as respectively printed on the face of the card adjacent the upper and lower edges of the main window.

Thus in Figure 1 the dial setting shows Gilroy and Salinas as being distant from one another 29 miles, the distance from Gilroy to SanFrancisco 80 miles and the distance from Salinas to Tia Juana 491 miles.

The complete dial for the trip designated by the map of Figure 1 is illustrated in Figure 2, the total divisions of the dial being equal to the division of the map and the double sets of Figures in the largest circle of figures indicating the miles to the terminal points being placed the proper distance in advance or behind the cities to which they allude to appear at the small openings 11 and 12 when the proper cities register in the main window.

When the terminal cities both appear in the window as in Figure 3, the dial is set for starting the trip from either end of the road, it being merely necessary to unfold the cities to the window in the order in the same direction as they are being traversed according to the map.

If the card is double as indicated in Figures 1 and 4, it may be secured at the corners as indicated at 13 with the dial between the cards thus providing for a different trip on each side of the card.

In Figure 5 a circular form of the device is shown, both card 1' and dial 7' being round so that they may be revolved one upon the other when gripped between two fingers of one hand. All elements function the same as the windows of Figure 1 described and bear similar numerals primed, though the main window is varied slightly in shape and the dial is provided at zero setting with extra instruction lines stating the direction to start for either terminal of the trip.

The panel 2' may be used for the map of the trip as with Figure 1 or it may be used for advertising matter as desired.

In contemplating my invention as above set forth it will be seen in its complete form to be a map of the road being traveled upon, with a cooperating mechanical device giving progressively and in proper order the distance from the point reached to either terminal as well as the distance to the next adjacent point, also that the device may be operated by one hand of a vehicle driver and when normally so operated the map exhibits the road in substantially corresponding extension to the actual road over which the vehicle is traveling, and while I show a device in which the names of two adjacent cities are exposed at once in the indicating window, it is manifest that any number may be so exposed or one only if desired.

I claim:

1. In a route chart a dial bearing consecutively the names of cities along the route, numerals indicating the miles between adjacent cities, and numerals indicating miles from the various cities to a terminal point of the route, means covering said dial adapted for successively exposing to view the names of two adjacent cities only and the indicated mileage separating them and the indicated mileage from one of the cities to the route terminal.

2. In a route chart a dial bearing consecutively, the names of the cities along the route, numerals indicating the miles between adjacent cities and numerals indicating miles from the various cities to the terminal points of the route, means covering said dial adapted for successively exposing to view the names of two adjacent cities only, and the indicated mileage separating them, and the indicated mileage from one of said cities to one of the route terminal together with the indicated mileage from the other of said cities to the other terminal of the route.

LLOYD A. T. SOLDANE.